W. S. DORMAN.
BOTTLE NECK FORMING TOOL.
APPLICATION FILED JULY 27, 1910.
Reissued Dec. 12, 1911.
13,339.
2 SHEETS—SHEET 1.
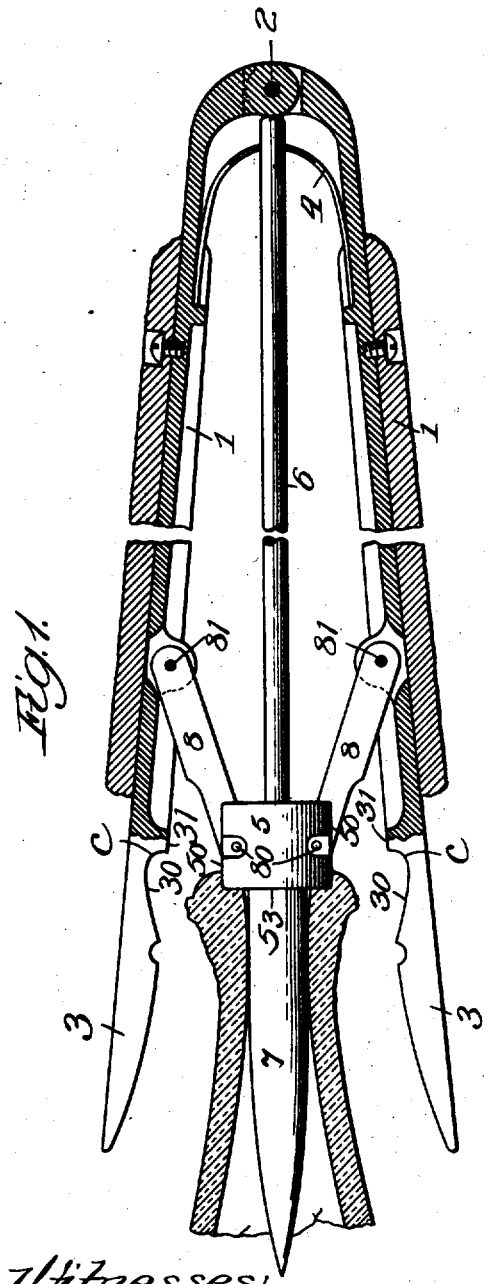
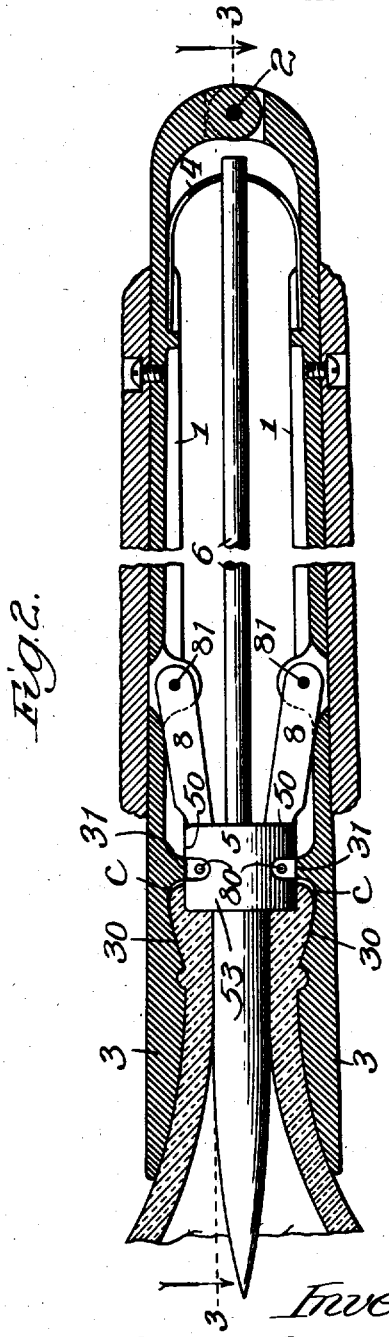
Witnesses:
E. E. Claybed.
H. F. Chase.
Inventor:
William S. Dorman,
By Dyrenforth, Lee, Christy & Wiles,
Atty's.
COLUMBIA PLANOGRAPH CO., WASHINGTON, D. C.

W. S. DORMAN.
BOTTLE NECK FORMING TOOL.
APPLICATION FILED JULY 27, 1910.
Reissued Dec. 12, 1911.
13,339.
2 SHEETS—SHEET 2.
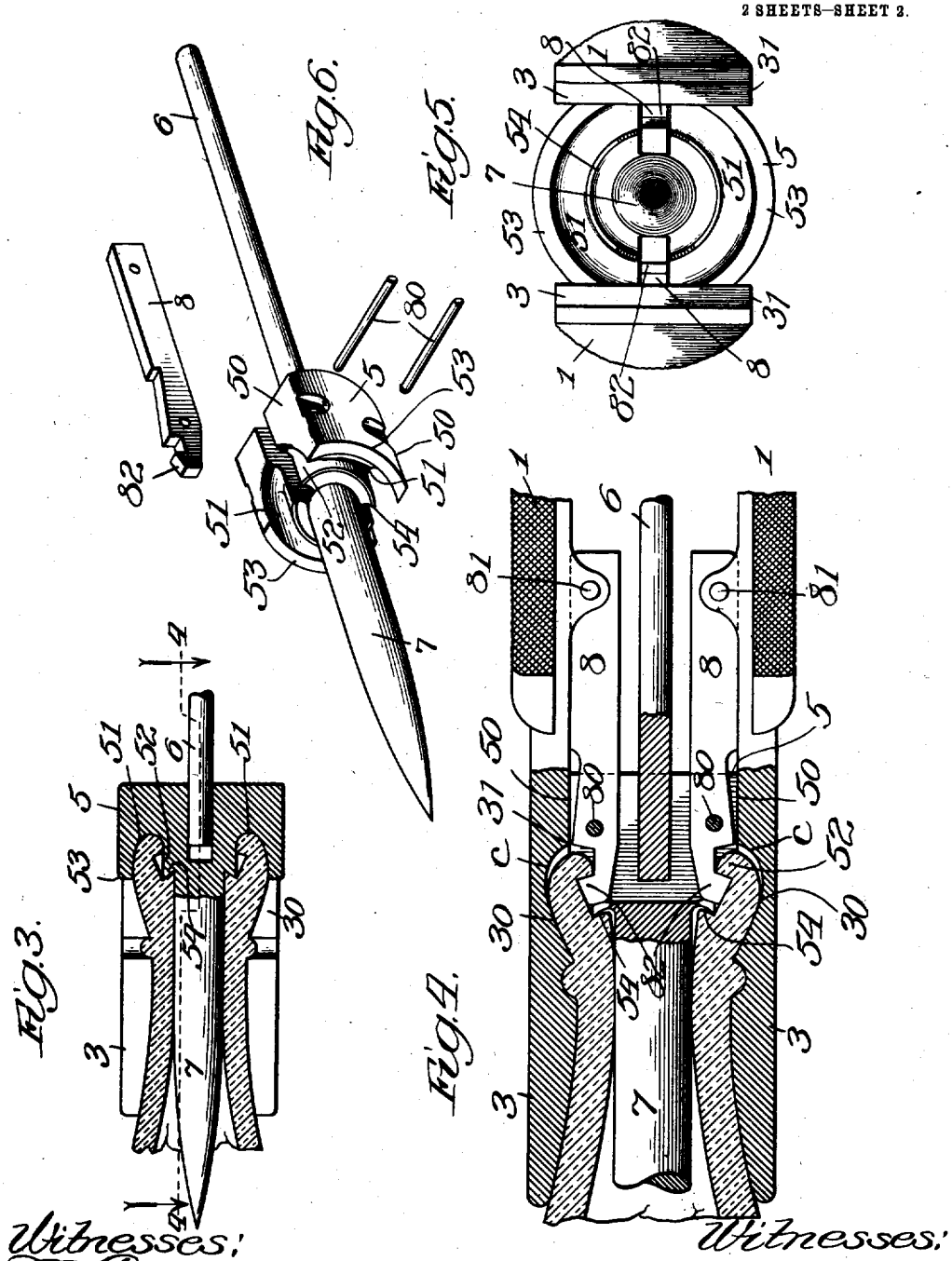
Witnesses:
Ed. E. Gaylord.
G. F. Chase.
Witnesses:
William S. Dorman,
By Dyrenforth, Lee, Critton & Miles,
Att'ys.

UNITED STATES PATENT OFFICE.

WILLIAM S. DORMAN, OF BROOKLYN, NEW YORK, ASSIGNOR, BY MESNE ASSIGNMENTS, TO RICHARD A. CANFIELD, OF PROVIDENCE, RHODE ISLAND.

BOTTLE-NECK-FORMING TOOL.

13,339. Specification of Reissued Letters Patent. Reissued Dec. 12, 1911.

Original No. 920,550, dated May 4, 1909, Serial No. 422,784. Application for reissue filed July 27, 1910. Serial No. 574,208.

*To all whom it may concern:*

Be it known that I, WILLIAM S. DORMAN, a citizen of the United States, residing at Brooklyn, Kings county, New York, have invented certain new and useful Improvements in Bottle-Neck-Forming Tools; and I do hereby declare the following to be a full, clear, and exact description of the invention, such as will enable others skilled in the art to which it appertains to make and use the same.

This invention relates to certain improvements in bottle neck forming tools; and the objects and nature of the invention will be readily understood by those skilled in the art in the light of the following explanation of the accompanying drawings illustrating what I now consider the preferred embodiment of my invention from among other formations within the spirit and scope of said invention.

An object of the invention is to provide certain improvements in formations of parts and details and in combinations and arrangements whereby a highly efficient and improved bottle neck forming tool will be produced capable of forming bottle necks accurately of uniform size or diameter.

The invention consists in certain novel features in construction and in combinations and arrangements as more fully and particularly set forth hereinafter.

Referring to the accompanying drawings:—Figure 1, is a longitudinal section showing the tool applied to a bottle mouth and illustrating the first step in the forming process. Fig. 2, is a corresponding view showing the next or final step in the forming process, the arms or handles having been pressed or swung inwardly to their limits of inward movement to bring the forming jaws thereof to operative position. Fig. 3, is a broken section on the line 3—3, Fig. 2. Fig. 4, is a broken longitudinal section, enlarged, on the line 4—4, Fig. 3. Fig. 5, is an end view. Fig. 6, is a detail perspective of the forming head or hood, the centering or forming pin or mandrel, and one of the connecting links or levers.

In the drawings, 1, are the handles or arms suitably hinged together at 2, at corresponding ends to permit the arms to swing toward and from each other in the same plane. At their free ends, these arms are provided with the opposing forming jaws, 3, rigid with and forming continuations of the arms. The inner faces of the jaws are of such configuration or formation as may be required to produce bottle necks of the exterior formation desired. For instance, each jaw across the inner end portion of its working face is formed with a transverse groove or concavity 30, of the approximate curvature of the exterior of the head or bulge of the upper end of the bottle neck or mouth, and at the inner end of said concavity 30, the working face of the jaw terminates at a transverse stop or bearing face or edge 31.

The arms are usually provided with means normally or yieldingly holding the same in inoperative position and at their limits of separating movement. Various means can be employed for this purpose, although in the specific example illustrated, I show a U-shaped plate spring 4, inserted between the hinged ends of the arms to yieldingly hold them in inoperative position, as shown in Fig. 1, whereby the closing movement of the arms to bring the jaws to operative position, Fig. 2, will be against the tension and resistance of said spring.

A forming head or hood 5 is arranged or mounted non-rotatably between the inner end portions of the working faces of the jaws, and this head is provided with a longitudinal stem 6, rigid therewith and extending toward the hinge connection between the arms. The stem passes loosely through a perforation in the spring 4, and is guided and held thereby against lateral deflection. The hood 5, is also provided with a forwardly extending longitudinal centering and forming pin or mandrel 7, rigid therewith and tapering to its free extremity. The free ends of the swinging arms 1, are connected together through the medium of the hood 5, and a pair of links or levers 8. The hood is longitudinally slotted from its back end, in a diametrical plane to receive said levers 8, which are respectively fulcrumed or pivoted in the hood near their front extremities by pivot pins 80. The front ends of the levers are arranged in diametrically opposite portions of the hood, and the levers extend rearwardly from the hood and at their rear ends are pivotally joined to the inner sides of their respective arms 1 by suitable means such as transverse pivot pins 81. The levers 8 extend forwardly in the hood beyond their fulcrums 80, therein, and each lever at the outer edge of its front end, within the hood, is formed with a projecting tooth 82, preferably having a sharp or square rear edge or shoulder. The hood 5, is composed of a block or head having the opposite parallel flat side faces 50, through which the slot containing the levers 8, centrally opens, and these flat bearing faces of the hood are arranged opposite and are adapted to receive or be engaged by the stop faces 31, of the forming jaws, respectively, when said jaws are in operative position. The front forming or working end of the hood or seat-forming and lip forming block, 5, is constructed and designed to form or shape the interior surface and stopper-seat, or seal-seat, of the bottle-mouth, and, also, the exterior surface of the bottle-mouth to the highest point that is to the point of greatest diameter of the exterior of the head or bead of the bottle mouth or neck, independently of or before the forming jaws are brought into action to shape the exterior of the bottle neck below said point of greatest external diameter and to swage or compress the glass to proper shape on the mandrel. To this end the front end of the block constituting the hood is formed with deep, segmental forming or shaping concavities 51 about concentric with the mandrel and arranged diametrically opposite each other and intersected by the flat faces 50, of the block. In other words, the shaping concavities 51, form similar segments having a common radius and would form a single annular groove, shaping or forming cavity, were it not for the planing of the block to produce the flat surfaces 50, which are thus intercepted by the groove. The walls of the concavities at the opposite ends thereof usually flare or taper and merge on curved lines into the flat faces 50.

The concavities are thus located between the enlarged slotted cylindrical hub or base portion 52, of the mandrel and the skirts or flanges 53, arranged at the ends of the hood block, and each concavity, in cross section at a point centrally between its ends, is of the form and shape of the wall of the bottle mouth or neck head in cross section down to the point thereof of greatest external diameter.

Although, I do not wish to so limit all features of my invention, yet in the specific example illustrated, the tool is designed to produce a bottle having an annular internal sealing seat or shoulder and an annular groove or over hanging annular locking shoulder interposed in the surrounding wall of the bottle mouth between said seat and top edge of the bottle mouth. To this end, the base 52, of the mandrel, between the depending skirts 53, of the forming hood, terminates in the abrupt annular shoulder 54, from which the tapered portion of the mandrel projects to form the reduced interior of the bottle neck below the interior annular sealing seat heretofore referred to, which seat is formed in the bottle mouth by said shoulder 54. The skirts or flanges, 53, thus constitute external lip-shaping bits, while the hub-portion 52, or the segments into which the hub is divided by the longitudinal slot may be regarded as a seat-forming bit or bits.

In the specific example illustrated, I show the shoulder 54, of the mandrel concaved or counter-coned, *i. e.* reduced inwardly from its outer annular edge to the cylindrical longitudinal wall of the reduced portion of the mandrel to thereby form the interior annular seat in the bottle mouth with a raised inner edge and an annular depression or groove between said edge and the surrounding vertical inner annular wall of the bottle mouth although I do not wish to so limit all features of my invention.

To form the internal annular groove, or overhanging locking shoulder in the wall of the bottle mouth below the top edge thereof, the extended ends of the levers 8, are provided with the teeth or projections 82, which are so arranged that when the arms are brought to operative position with their jaws up against the flat faces of the hood, said levers will be rocked to swing their front ends outwardly and project the teeth 82, radially beyond the circle of the circumference of the base 52, to cut the groove in the bottle, just above the annular seat therein and a distance below the top surrounding edge of the bottle mouth. When the arms are in their normal separated positions, the front ends of the levers 8, are swung inwardly with their cutting teeth withdrawn into the mandrel base. However, I do not wish to limit all features of my invention to the employment of the levers having the cutting teeth nor to reducing the mandrel below its base to form the internal shoulder.

In using the tool of this invention, the bottle neck mouth is reheated to the desired degree, and the mandrel is then thrust into the bottle neck and the hood is pressed against the mouth or head thereof while the bottle is rotated and the tool held stationary, or vice versa. During this preliminary or bottle mouth forming operation, the jaws remain inactive or in inoperative position. During the operation as so far stated, the soft plastic glass of the bottle mouth is forced into the hood and by the relative rotation of the parts the shaping or forming concavities of the hood accurately shape the bottle mouth from its top edge down to its point of greatest external diameter and also accurately shape that portion of the interior of the bottle mouth included within the hood, that is around the mandrel base, and which includes the seat for the seal or stopper. The said head portion of the bottle mouth is thus by the hood, shaped and formed accurately of the desired external and internal diameter, so that all bottle heads or mouths will be reshaped accurately to a uniform diameter and form. The soft glass of the portion of the bottle mouth shaped by the hood is partially and quickly chilled by contact therewith, but the surplus soft glass is forced downwardly by the action of the hood in forming the upper part of the head, as indicated in Fig. 1, to a point below or beyond the skirts of the hood, in condition to be acted on by the forming jaws. The operator in rolling the bottle after the application of the tool thereto, instinctively or involuntarily compresses the arms to bring the jaws to operative position. When the arms are swung toward each other, the levers 8, force the hood longitudinally toward the bottle and the hood thereby tends to swage or further compress the soft glass of the bottle neck beyond that portion of the head previously formed and chilled by the hood, and at about the same instant, the jaws are brought into operative contact with the soft glass of the rolling bottle and compress the glass properly to and around the reduced portion of the mandrel and properly against and into the annular concavity of the shoulder at the front end of the mandrel base to form the sealing seat in the bottle mouth. The working faces of the jaws also engage the soft glass bulged out beyond the skirts of the hood and gradually work the same outwardly or forwardly along the bottle neck toward the pointed end of the mandrel, and until the stop faces 31, of the jaws engage the flat faces of the hood and limit further inward movement of the jaws.

The forming concavities 30, of the jaws are formed to work the surplus glass toward the body of the bottle and to smooth off the exterior of the bottle head downwardly or forwardly from the point of greatest bottle head diameter and in smooth continuation of the surface formed by the hood so that the jaws can be easily brought to their limits of inward movement and against the hood as the portion of the glass chilled by the hood will not interfere with or prevent the full closing movement of the jaws.

Usually the rear or inner portion of each jaw concavity 30, that is the portion in the same transverse plane as the shaping concavities of the hood, is somewhat increased in depth to clear the glass surface previously shaped by the hood. This clearance is particularly shown in Fig. 4, wherein it is indicated by the reference letter *c*. It will thus be observed that the skirts of the hood extend forwardly on the exterior of the bottle mouth to the transverse plane of the greatest external diameter of the bottle head and very quickly and accurately shape and form said head up to such plane to the desired diameter, before the jaws reach operative position to press down and shape the glass forwardly beyond the plane of greatest external diameter of the bottle head.

Material advantages in the practical manufacture of bottles adapted to be sealed by caps or metal plugs applied under pressure are thereby attained, as the bottle mouths can, by the use of my tool, be accurately made to a uniform diameter which is so essential to the successful application of sealing devices to the bottles without bottle breakage. The bottle neck forming tools heretofore generally employed were of such construction and formation as not to produce all bottle mouths of a uniform diameter, and hence a large percentage of bottles were broken, during the sealing or capping operation because of the variations in the shape and size of the mouths thereof. By the use of my tool, as set forth, the bottle mouths can be accurately formed of a uniform shape or diameter by reason of the peculiar hood employed therein, whether the tool be held stationary and the bottle rotated or the bottle be held stationary and the tool rotated by hand or mechanism.

It is evident that various changes and modifications might be resorted to in the forms, arrangements and constructions described without departing from the spirit and scope of my invention, hence I do not wish to limit myself to the exact construction disclosed.

What I claim is:—

1. A bottle neck forming tool comprising opposite forming jaws, means normally withholding the same from operative position, a bottle head forming hood having a forwardly projecting mandrel, and connecting levers between said hood and jaws, said hood having reduced side faces to receive said jaws and at its front end having bottle head shaping segmental opposite concavities forming skirts adapted to extend to the point of greatest external diameter of the bottle head, said concavities at their ends opening through said reduced side faces, said jaws formed to act on the bottle head and neck from said point of greatest diameter forwardly toward the bottle body, substantially as described.

2. A bottle neck forming tool comprising a hood having a fixedly related forwardly projecting mandrel to enter the bottle neck, said hood at its front end having forwardly projecting skirts formed to shape the exterior of the bottle head forwardly to the plane of the greatest external diameter thereof, said skirts being spaced from the base of the mandrel and in connection therewith forming bottle mouth shaping concavities, and opposite normally withheld forming jaws movable to operative position with respect to said hood to shape the bottle head forwardly therefrom toward the bottle body, substantially as described.

3. A bottle neck forming tool comprising a hood having a fixedly related forwardly projecting mandrel to enter the bottle neck, said hood having opposite reduced side faces and at its front end on opposite sides of the mandrel and between said side faces formed with forwardly extending skirts to shape the exterior of the bottle head forwardly toward the bottle body about to the plane of the greatest external diameter of said head, and movable normally withdrawn forming jaws arranged opposite said reduced faces of the hood, substantially as described.

4. A bottle neck forming tool comprising a hood having a fixedly related forwardly projecting mandrel, said hood having reduced opposite side faces and at its front end having forwardly projecting skirts to shape the exterior of a bottle mouth about to the plane of greatest diameter and with said mandrel forming shaping concavities, and normally withheld movable forming jaws arranged opposite said reduced faces and having clearance spaces in the working plane of said skirts, substantially as described.

5. A bottle neck forming tool comprising a hood having fixedly related forwardly projecting skirts to shape the exterior of the bottle head, and a centering and forming mandrel projecting forwardly from within the hood and arranged centrally between said skirts and in connection therewith forming shaping concavities, and normally withheld movable oppositely arranged forming jaws to coöperate with said hood and adapted to shape the bottle head and neck forwardly beyond the working plane of said skirts, said jaws having their working faces formed to clear that portion of the bottle head shaped by said skirts.

6. A bottle neck forming tool comprising a hood having forwardly projecting bottle head shaping skirts and a centering mandrel rigid with and extending forwardly from the hood, said mandrel having an enlarged base rigid therewith and arranged midway between and spaced from said skirts and terminating in an annular shoulder 54, hinged yieldingly separated arms provided with opposing forming jaws arranged on opposite sides of said hood, and levers connecting said jaws and said hood, said hood being slotted to receive said levers, the forward ends of said levers having lateral teeth normally withdrawn in said mandrel base and adapted to project radially therefrom when said jaws are brought to operative position.

7. In a bottle-neck forming tool, the combination of a non-rotatably mounted forming-head equipped with a fixedly carried forwardly projecting mandrel and having seat-shaping and lip-forming bits located at different distances from the axis, said forming-head having diametrically opposed slots therein, groove-forming bits pivoted in said head and having operative ends normally sheathed in said slots, and means for holding said tool and projecting said groove-forming bits.

8. In a bottle-neck forming tool, the combination of a non-rotatably mounted forming-head having a fixedly carried central mandrel projecting therefrom and having also a pair of diametrically opposite seat-forming segmental bits struck on a given radius and a pair of diametrically opposite lip-forming bits in a plane at right-angles to the plane of said first-named bits and struck on a larger radius, a pair of groove-forming levers pivoted in said head and having their operative ends sheathed in slots in the rear of the extremities of said seat-forming bits, and a collapsible holder for said tool having operative connection with said groove-forming levers.

9. In a bottle-neck forming tool, the combination of a forming-head comprising a block having a central forwardly projecting mandrel and a substantially circular enlargement at the base of said mandrel, said enlargement concaved at its forwardly presented surface, and said block having cut-away sides and slots open at said sides, and outer shaping bits projecting forwardly from said block and separated from said enlargement by concavities which open at their ends at the reduced sides of the block, a pair of groove-forming levers pivoted in said head, and having their operative ends sheathed in said slots, a collapsible holder for said tool and operatively connected with said groove-forming levers, and members projecting forwardly from said holder, and provided with shaping surfaces adapted to shape the neck of the bottle below the point shaped by said forming head.

WILLIAM S. DORMAN.

In presence of—
CLAYTON F. MCKENLY,
ROBERT LEE SHRINER.

Copies of this patent may be obtained for five cents each, by addressing the "Commissioner of Patents, Washington, D. C."